United States Patent [19]

Helleur

[11] Patent Number: 4,640,742
[45] Date of Patent: Feb. 3, 1987

[54] METHOD AND APPARATUS FOR CONTROLLING THE SIZE OF AN OPENING THROUGH WHICH A PRODUCT IS METERED

[76] Inventor: Donald E. Helleur, 221 Mortlake, St. Lambert, Quebec, Canada

[21] Appl. No.: 650,783

[22] Filed: Sep. 17, 1984

Related U.S. Application Data

[63] Continuation of Ser. No. 459,327, Jan. 20, 1983, abandoned, which is a continuation-in-part of Ser. No. 306,465, Sep. 28, 1981, abandoned.

[51] Int. Cl.$^4$ .............. B29C 39/38; B29C 39/44; D21C 1/02; D21C 1/06
[52] U.S. Cl. .................. 162/212; 162/259; 162/347; 264/40.7; 425/141; 425/144
[58] Field of Search .............. 162/252, 253, 259, 262, 162/344, 341, 347, 198, 50, 192; 425/141, 144, 150; 264/40.1, 40.7; 251/11

[56] References Cited

U.S. PATENT DOCUMENTS

| | | | |
|---|---|---|---|
| 3,261,893 | 7/1966 | George et al. | 162/347 |
| 3,463,701 | 8/1969 | Curtis | 162/347 |
| 3,940,221 | 2/1976 | Nissel | 425/141 |
| 4,252,519 | 2/1981 | Farmer et al. | 425/141 |
| 4,358,342 | 11/1982 | Nuttall | 162/259 |

FOREIGN PATENT DOCUMENTS

| | | | |
|---|---|---|---|
| 211648 | 10/1960 | Austria | 162/192 |
| 510552 | 6/1976 | U.S.S.R. | 162/192 |

Primary Examiner—Steve Alvo
Attorney, Agent, or Firm—Robert J. Schaap; Eric Fincham

[57] ABSTRACT

The present invention teaches a method and apparatus for controlling the size of an opening through which material is metered by generating energy in the form of a magnetic field close to an element which forms an integral part of the metering device, the element movable relative to another member. The method and apparatus can be utilized for controlling a desired physical property of a product which is dependent on the metering operation, such properties as basis weight, caliper, density, bulk, reel hardness, gloss, smoothness, and opacity, of interest in the paper, plastics and coating fields.

15 Claims, 16 Drawing Figures

METHOD AND APPARATUS FOR CONTROLLING THE SIZE OF AN OPENING THROUGH WHICH A PRODUCT IS METERED

This is a continuation of application Ser. No. 459,327, filed Jan. 20, 1983, now abandoned which was a continuation-in-part of application Ser. No. 306,465, filed Sept. 28, 1981, now abandoned.

This invention relates to a method and apparatus for controlling the size of an opening through which material is metered.

In particular, this invention teaches an improved method and apparatus for controlling a metering device which in turn, may control the physical property of a product.

One particularly useful aspect of the present invention, as aforementioned, is the use of the improved method and apparatus to control the desired physical property of a product. For example, in paper-making, the fibers composing the raw paper are first suspended in water and then after several operations they are finally metered by a device known as a slice onto a moving wire mesh where most of the water is removed leaving behind a web of fibers which, after pressing and drying, are transformed into a web or sheet of paper. The slice is a slot or generally rectangular orifice at the front of the head box which allows the pulp suspension or stock to flow out from the head box onto the moving wire mesh. In general, major changes in the basis weight, caliper, etc. of the sheet are made by changing the consistency/rate of flow of the pulp suspension; small overall and/or transverse profile changes to caliper, etc., and changes to paper formation and related properties, are generally made by changes to the slice opening. While these changes may be small, they can have a major influence on the quality of the final paper.

It is an object of the present invention to provide a method for controlling the size of an opening through which material is metered, which method can be operated remotely from the metering device.

A further object of the present invention is to provide a method and apparatus for controlling a desired physical property of a product where one of the manufacturing operations involves the metering of at least one component of the product through an orifice.

In one aspect of the present invention, there is provided an apparatus for controlling the size of an opening through which material is metered, the opening being defined by at least first and second members spaced apart from each other, with at least one of the members movable towards or away from the other member to change the size of the opening, means for generating a magnetic field said magnetic field generating means being associated with the movable member to cause its movement relative to the other member when the magnetic field generaing means is operated.

In a further aspect of the present invention, there is provided a method for use in controlling the size of an opening through which material is metered, at least part of the opening being defined by a movable edge, the method comprising associating heat-expandable means with the edge to move the edge, positioning magnetic field generating means adjacent the heat-expandable means, and selectively operating the generating means to heat the expandable means to move the edge to control the size of the opening.

In a further aspect of the present invention, there is provided a method and apparatus for controlling a desired physical property of a product where one of the manufacturing operations involves the metering of at least one component of a product through an orifice, said orifice being defined by a plurality of segments which can move to vary the size, orientation and profile of said orifice and wherein said variations in size, orientation and profile can change the average value and profile of the desired property, at least a portion of segments being of a material which will allow the local length of any transverse segment of the element to heat up and change in dimension and thereby change the local orifice size and thereby change the quantity of the component passing through the orifice, the transverse segment being heated by means of energy in the form of a magnetic field generated at the segment.

The method and apparatus, as aforementioned, can include a plurality of transverse segments and energy generating means so that a transverse profile as well as the average transverse value of the desired property can be controlled. The method can be used in conjunction with the steps of taking a measurement of the desired property, generating an electrical signal proportional to this property measurement, taking the signal and using it to control the changes in the energy so that the desired property will be controlled by the corresponding changes in the metering operation.

In greater detail, the present invention employs induction heating for heating a heat-expandable means which controls the size of an orifice. Various means for arranging the coil can be provided as is known to those skilled in the art.

In one particular embodiment, the invention can be applied for use in systems which employ rod and screw adjustments which operate to adjust the orifice size. Thus, rods themselves could be subjected to the heating effects of the induction heating coils. In general, the expansion elements or segments may consist solely of individual rods or strips or in the alternative, of a solid flat surface which may or may not be connected by short rods to the orifice. In all embodiments, the rods, strips or expansion segments or elements should be rigid enough to avoid bending thereby depriving the element of its movement. In most cases, a restricting element is involved to force the expansion motion to take place in the direction of the orifice edge; only in special applications would it be necessary for the expansion to take place in more than one direction. The material of which the movable member or expansion segment is made can be of any suitable material known to those skilled in the art and is preferably of a composition which responds quickly to induction heating and expands and contracts easily with small changes in temperature. That is, it should be of a material which is electrically conductive and if it is also magnetic, hysteresis effects will assist in the thermal expansion.

Various segments or sections of the movable element may also be isolated and/or designed separately where it is required. It may also be desirable, in certain circumstances, to thermally insulate various parts of the expansion element from each other.

The choice of frequency at which the coils generating the magnetic field are operated would depend on the application and desired results. In general, the lower the frequency, the deeper the penetration of the magnetic field into the movable element. However, the lower the frequency, the lower the efficiency of energy transfer in certain electrical circuits. Certain coreless coils are more effective at higher frequencies, but present electronic circuitry tends to limit the frequency to the 25,000 Hz level. Methods to be described later using magnetic cores can use lower frequencies (50–60 Hz) to good advantage.

In general, frequencies in the 1,000 to 10,000 Hz range are suitable for most applications although the frequency may vary outside of these ranges as is known to those skilled in the art. The voltage used will naturally depend on the application being used.

In one particular aspect of the present invention, there is provided a method of converting existing mechanical orifice control mechanisms with a system according to the present invention. Prior art proposals for varying the lengths of elements/rods by thermal expansion have generally involved using special resistance heating elements through which electric current is passed to heat the element. The heat from this element, which is usually inserted inside a special hollow rod or tube, flows (mainly by conduction) to this special rod, which has a high thermal expansion characteristic and which rod in turn is connected to the metering orifice. Thus, by controlling the electric current to the resistance heater the size of the orifice can be controlled. However, such a system cannot be easily adapted for existing mechanically controlled rod systems and the cost for replacing the mechanical systems is substantial. In addition, the resistance heating elements tend to wear out/break down relatively easily. In certain instances wherein the heating elements are wound or placed around the exterior of the rod, problems of rod cooling or contraction appear.

In the present invention, instead of using Joule's Law coupled with that of Fourier's Law under which the above prior art devices operate, applicant found that existing control rods are generally made of a material (steel) wherein it is possible to heat them directly by electromagnetic induction (Faraday's Law) with a high efficiency, as the magnetic flux generated passes directly into the control rod itself creating eddy currents, thereby heating it. Thus, rather than use indirect heating, applicant directly heats the control rods/elements.

In one particular embodiment, one may combine the principles utilized in induction heating with the properties of the material forming the structural rod member making it possible to utilize the structural rod to provide movement in two opposing directions (the expansion/contraction directions) with a force equal to that permitted by the stuctural strength of the material forming the rod member. In particular, it has been found that certain design parameters provide for optimum functioning of such a system.

One problem which must always be considered when heating a control rod is achieving a proper balance between heat energy into the system and heat dissipation as well as the balancing of the rate at which these two actions take place. Large increments of thermal expansion require higher temperatures (and higher energy inputs); with a minimum of heat insulation this leads to high heat outputs (radiation etc.) and in turn to high inputs (i.e. higher current) to maintain these higher temperatures. While insulation reduces these higher inputs, it also reduces the output and thereby the rate or degree of contraction. To overcome this dilemma, there is provided a second (partially insulated) expansion/contraction element to overcome the reduced contraction of the partially insulated first expansion/contraction element. The two elements are placed "structurally in parallel".

Having thus generally described the invention, reference will be made to the accompanying drawings illustrating embodiments thereof in which.

In the description of the instant application, it will be understood that the use of induction heating and the equipment required is well known to those who are knowledgeable in the art and hence, no detailed description of such equipment is given.

Figure 1:
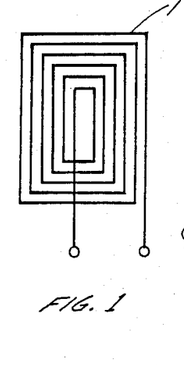
FIG. 1 is a front view of an individual induction coil which faces the surface of an orifice segment at which a magnetic field is to be generated.
Figure 2:
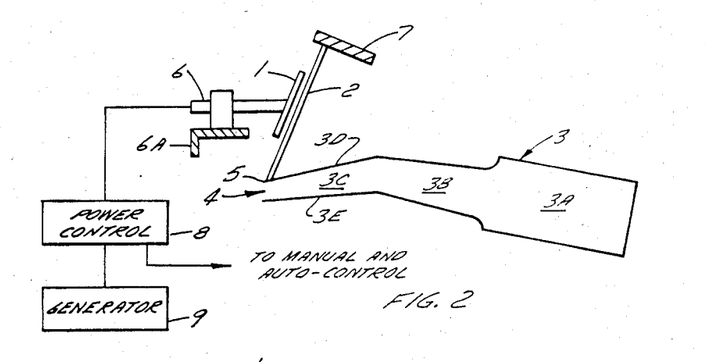
FIG. 2 is a schematic view of the arrangement of the invention as applied to a paper-making slice.

Turning to FIG. 1, there is illustrated one arrangement for coil construction, the view is of that side of the coil facing an expansion element 2 and orifice edge as shown in FIG. 2 and as will be discussed in greater detail hereinbelow. The coil could, of course, be of any convenient size and shape depending on the application and design of the movable member expansion element and orifice edge. It will be noted that coil 1 is relatively thin and where one coil of wire is used, the thickness would be that of the wire itself; in the illustrated embodiment, the cross-sectional shape is flat and in front view, rectangular.

As illustrated in FIG. 2, individual coils 1 are mounted on suitable supports 6, with each support having associated therewith a main beam 6a. Each support 6 can be made adjustable and arranged so that the coil 1 is as close as possible to an expansion element 2 as shown in FIG. 2. Alternatively, if convenient, coils 1 could be directly attached to the expansion element 2 without the need for support beams 6a.

Expansion element 2 can be designed in many ways depending on the application and the desired results.

Expansion element 2 is considered as part of the movable member and deformable edge of the orifice. It may be a single, fat, thin surface with one side or edge acting as a top edge of the orifice, with the opposing edge being restricted from movement by a restricting element 7 so that any thermal expansive motion is forced to take place in the direction of the orifice edge. By forcing the thermal expansion to take place in the direction of the orifice edge, the operator of the induction heating coils is then in a position to control the profile and average size of the orifice to which the component of the product is passing. The restricting element could be a fixed base or an adjustable fixed base.

Figure 4:
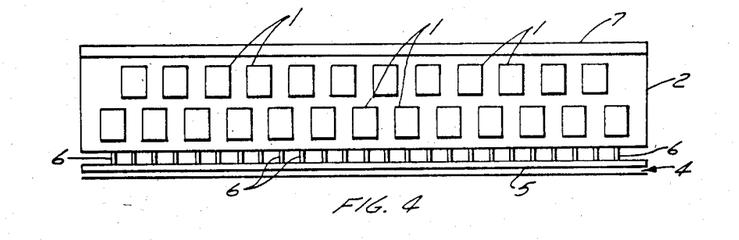
FIG. 4 is a schematic view of the arrangement of various coils along the length of an expansion element controlling the slice profile of FIG. 2.

The embodiment illustrated in FIG. 2 is a simple one utilizing a flat surface of the expansion element. However, in certain applications, such an expansion element may be too rigid to obtain desired results. Thus, one may separate the flat expansion surface from a flexible orifice edge or slice lip (as in paper making) by a series of short rods with each rod serving that segment of the expansion element that was under the influence of its respective coil. Reference may thus be had to FIG. 4 where a plurality of coils 1 are spaced across expansion element 2 whose upward movement is restricted by element 7 and whose downward movement shapes the size and profile of orifice opening 4 by bending, deforming and flexing slice lip 5 which is connected to element 2 by short rods or connectors 6.

The expansion length of element 2 will, of course, depend upon the temperature variation required or desired and material used for the element which in turn depends on the range of a change desired in the property of the web being controlled. Also, the dimensions of the coils will depend on the dimensions of the expansion element and on the fineness of control desired.

Referring to FIG. 2, it is shown that a paper machine stock delivery system 3 consists of a headbox 3A, stock approach system 3B, apron or lower slice element 3E and upper slice element 3D, of slice system 3C, with a lower edge 5 of expansion element 2 defining the size and and shape of the orifice or slice opening 4. By controlling the power from a generator 9 to each of the power control units 8 servicing each respective coil 1, the operator or an automatic control system is capable of controlling the size and shape of orifice opening 4 and through this, the average transverse value and profile of the desired property of a web which is formed from the stock leaving the slice.

Figures 6, 7, 8:
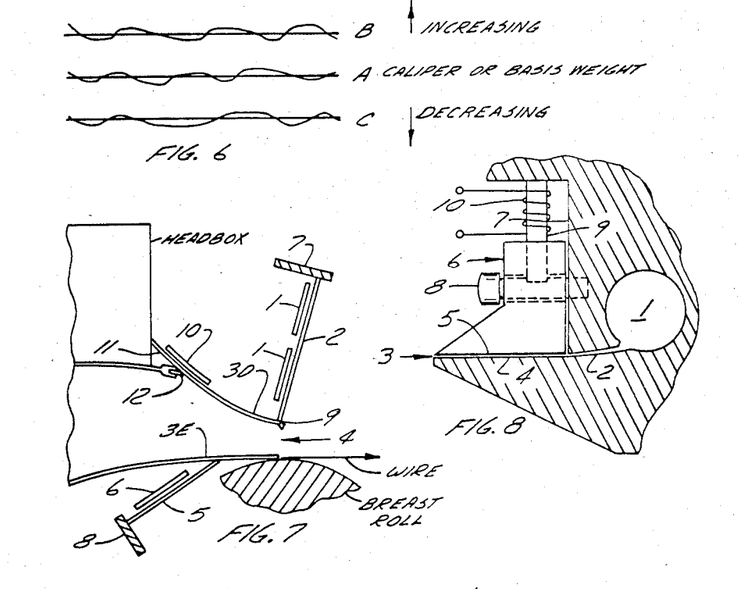
FIG. 6 illustrates a transverse profile and the average transverse value of one property of the web which the invention can control.
FIG. 7 is a cross-sectional view illustrating how the arrangement can be used to control a number of slice elements.
FIG. 8 is a sectional view illustrating the application of the method to a straight extrusion die.

Present paper-making systems employ rods and screw adjustments for adjusting the slice. The present invention can be utilized in such a construction, and to this end, reference may be had to FIG. 8. Thus, as shown in FIG. 8, the rods themselves can be subjected to the heating effects of the coils formed to the proper shape to accommodate the rods. Placing the coils around the rods increases the efficiency of energy transmission in comparison to the coreless coils of FIGS. 2 and 4. The screw adjustments could be left in if desired as a backup system in the event power was not available to energize the coils. In certain instances, such a structure may be advantageous in large movements of the slice lip or edge could be made by the rod and screw or other suitable adjustment thereby avoiding any necessity for long expansion elements to provide the necessary linear movement to effect the required change in average orifice size. It will be understood that while there are several advantages of using rods only, the flat surface approach is also advantageous in that the surface represents an infinite number of rods and if the fineness of profile control is to be changed, one merely has to change the number of coils and associated power control units.

In other words, it is evident that the expansion element can consist solely of individual rods or strips, or a solid flat surface connected or not by short rods to the deformable slice lip. The rods, strips or expansion surface should, of course, be rigid enough to avoid bending thereby depriving the element of its downward expansive movement towards the orifice lip or edge. The expansion element can be made of any suitable material, preferably of a composition which responds quickly to induction heating and in addition, expands and contracts readily with small changes in temperature. The material should be electrically conductive and if it is also magnetic, hysteresis effects will assist in the thermal expansion. If desired, sections of the expansion element may be isolated and/or designed separately where that part of the slice opening has been markedly different from the main part. Thus, for example, in paper making the front and back sides of the slice (the two edges of the paper web) may be designed along these lines. It is also possible to thermally insulate various parts of the expansion element from each other, for example: the main surface from the slice lip which is rapidly being cooled by the issuing stock; the various transverse segments so that each adjacent segment does not restrict movement of the other; the element itself so that it will respond more quickly and efficiently; the main surface from the orifice edge in the situation where an increase in temperature of the edge will affect the material passing by it or in other words, increase its flow due to increased fluidity. It may also be desirable to shield parts of the elements from contact with the stock—i.e. from the fluid flowing through the orifice either from direct contact or indirect through splashing or the like.

From the above, it will be seen that the present invention has been applied to varying the size and shape of one edge or one part of the orifice which, in the illustrated embodiment, is the upper lip of a slice. However, it is also possible to influence the effect of the orifice (and through it, the properties of the web) in other ways such as by varying the orientation of the various parts of the orifice to each other. For example, in paper making, it is important to be able to control the angle at which the stock jet leaves the slice; in addition, the jet is affected by the relative location or orientation of the upper and lower slice lips and also by the tip of the upper lip.

Referring to FIG. 7, there are illustrated a number of slice elements. The lip of the upper slice element 3D is controlled, as described for FIGS. 2 and 4 by expansion element 2 and two rolls of coils 1 with restrictor 7. The bottom slice element or apron 3E can be moved up or down by an additional expansion element 5 restricted by stop 8 and heated by coil 6. Since it is not necessary to control the profile of the edge of 3E, coil 6 may be a single coil covering the transverse surface of element 5. Alternatively, coil 6 may consist of a number of coils spaced across the surface and controlled by one power control unit. Movement of the bottom slice element or apron 3E will not only vary the angle of the jet issuing from the orifice opening 4, it will also change the size of the opening and the orientation of the lower lip with respect to the upper lip 3D and its tip 9.

To further vary the orientation of the orifice elements, an additional coil 10 may be placed opposite an expansion element 11, which in turn, is an extension of upper lip 3D pressed against seal 12 thereby allowing movement of 3D without leakage. Coil 10 would be similar to coil 6 in its operation and will allow the edge of 3D and tip 9 to move horizontally.

Desirably, the upper and lower lips of the slice are insulated from the cooling effects of the stock. Coil 10 can then be placed closer to the upper lip edge and a further coil could be applied to the underside of the lower lip 3E so as to control its movement horizontally. Alternatively, a system similar to the upper lip could be used.

Referring to FIG. 4, when it is desired to vary the profile of the edge of the orifice or slice, a plurality of coils are used. The fineness of adjustment is determined by the number of coils and their spacing. In FIG. 4, fine adjustment may be achieved by using two rows of coils and allowing each coil to slightly overlap the area of the adjacent coils. For rougher control, one row would be adequate. Each coil can have its own power control circuit 8 fed from a common generator 9.

Figure 3:
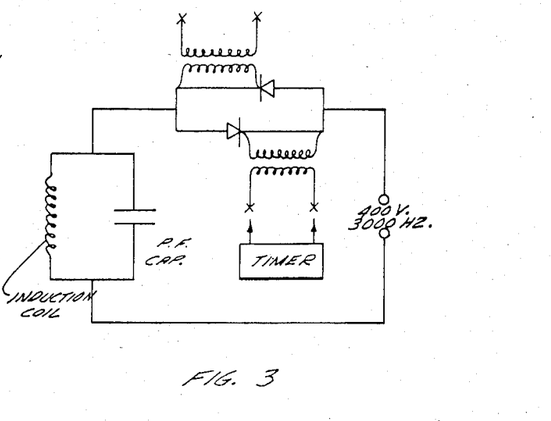
FIG. 3 is a schematic view of the power control circuit controlling each coil.

Thus, referring to FIG. 3, there is shown one arrangement of a power control circuit operating each coil which involves an on-off method of controlling power using a silicon-controlled rectifier. The timer maintains power on or off over specific time periods. Alternatively, other well-known methods can be used such as a modulating type circuit. The timer can be controlled by an operator or automatically by a computer tied into a sensing device measuring the property of the web that the orifice is capable of controlling.

In the case of paper making and other similar processes two common properties that the orifice are capable of controlling are caliper and basis weight along with web formation, opacity, show-through, and other properties related to uniformity of web structure. Device for sensing these properties are available and could be tied in to a closed loop to control the orifice and through it the desired property of the final web.

While in most cases, it is desirable to have the properties of the final product control the size of the orifice, sometimes this might not be desirable or possible. For example, because of the time lag between the property value and the condition of the orifice that produced that value, it may be too late to correct for any discrepancy/variation from the desired value, in other words, other changes have occurred in the meantime. This can be the case for the above papermaking application where the basis weight is often measured at the dry end of the machine.

This suggests that a property value should be measured if possible right at the orifice or as close as possible to it. In the above example the basis weight (and moisture) should preferably be measured at the wet end; devices could also measure the components or other properties issuing from the slice e.g., dry/wet substance; jet velocity, etc.

Another possibility is to measure the properties of the orifice itself e.g., the size of the opening. Such a closed-loop system could be required where the opening is subjected to temperature, pressure or other stresses which alter the size of the opening and the present invention can be used to counteract these changes. Thus by using devices for measuring the average orifice size/the profile of the opening size, these values could be compared with the desired values and variations from these used to control the orifice size.

Thus, in a broad closed-loop sense, this present invention involves measuring one or more properties of the final product or the product in an intermediate stage or the opening itself and using the variations of these properties from the desired values to control the size of the opening.

Figure 5:
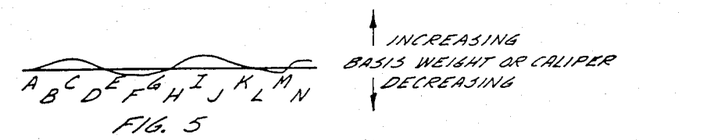
FIG. 5 illustrates schematically the transverse profile of a property of the web which the present invention can control.

Referring to FIG. 5 and with reference to the system illustrated in FIG. 2, the stock flow issuing through orifice 4 of slice 3 produces a final web having a profile as shown in FIG. 5. In the prior art, the operator would be required to manually operate the rod and screw arrangement to vary the shape/profile of the upper slice lip. Employing the present invention, on the other hand, the operator may increase or decrease the electrical power to those particular induction coils which would make the desired profile changes to the orifice and eventually to the profile of the property desired. The amount of power applied to the coil would be proportional to the magnitude of the property relative to the average value and/or the desired value. A closed-loop controller system could be used.

As shown in FIG. 5, the various induction coils are represented by letters and correspond to those orifice areas responsible for producing the profiles shown. Thus, in such a situation, the operator could increase electrical power to coils B, C, I, J and N and decrease the power to coils E, F, G and L in proportion to the divergence of the property value from the average value in order to eliminate this divergence and impart greater transverse uniformity to the web.

According to the present invention, the transverse profile can be controlled simultaneously with the control of the average transverse value of the desired property utilizing a plurality of coils. Depending upon the accuracy desired and the inter-relationship between any two properties, it is possible to control the transverse profile of one property simultaneously with control of the average value of the other property. Thus, coils 1, power controls 8 and generator 9 may be capable of raising the temperature of expansion element 2 to the desired control point plus the potential capability of transferring further energy to expansion element 2 in order to control the transverse profile as well as raise the heat level a controllable amount above the nominal amount level or raise it within the desired controllable range required for the particular property.

Referring to FIG. 6, it is illustrated the situation where coils 1 are operating approximately at 50% of their capacity to raise the temperature of element 2 to the desired point and so set the caliper or basis weight of an average transverse value of A. In an on-off mode of control, coils 1 would be on or off for approximately 50% of the time interval to maintain control. In such a situation, where profile was also being controlled, each individual coil would be operating at more or less than the 50% level depending upon which coils were being used to maintain the desired profile. When it is desired to raise the caliper or basis weight to an average level B, the average power input to the coils could be decreased to the level where they might be operating at, for example, 40% of their capacity. Similarly, in order to attain an average value of C, the power input could be increased to an average level of 60%. At each of these levels, the individual coils would be operating independently to maintain the desired transverse profile of the property being controlled.

It is desrrable that a certain percentage of the coil capacity be reserved so as to be able to vary the average transverse value of the property in question. In other words, if one wishes to allow a particular element, area or rod to contract a certain amount, that element would already have to be in a state of thermal expansion so that by reducing the power to the coils controlling that rod or element area, the thermal effect or temperature would be less and the rod or element would contract. The actual percentage of coil capacity employed for this potential contraction would depend on several factors known to those skilled in the art—i.e. length of rod, range of profile change, expansion characteristics of the material, etc.

In one particular aspect of the present invention, applicant's device may be employed to create a micro-turbulent condition within the flow of the stock onto the wire to prevent stock flocculation in a paper-making process. To this end, applicant provides a micro-vibrating slice lip or orifice edge; this approach is facilitated by the fact that the energy required to control the orifice profile and/or orifice size can be transferred to the expansion element without need for physical contact.

Referring to FIG. 2, orifice edge 5 and expansion element 2 could be connected to upper slice lip 3D by a flexible element; and restrictor 7, expansion element 2 and orifice edge 5 could be subjected to a high frequency micro-vibration from a suitable device (not shown). By proper choice of flexible connection between upper slice lip 3D and element 2, the nature and degree of the vibration transmitted to the upper slice could be controlled. Naturally, such vibrating devices are wellknown and the frequency of the vibration can be controlled by an operator or tied in a closed-loop system.

When the expansion element is moving or vibrating, it may, in certain instances, be desirable to use a permanent magnet or an electromagnet operating on direct current power to transfer energy to the element. Thus, the induction coil would be supplied with power at a frequency of 0 Hertz while the movement of the element generates the required frequency and current to heat the various segments.

Figure 9:
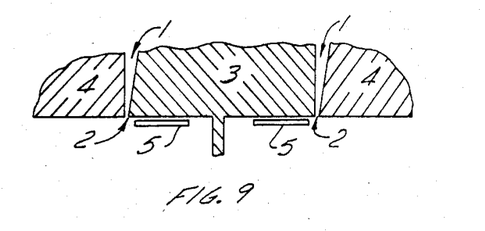
FIG. 9 is a sectional view of a circular extrusion die employing the present invention.

Referring to FIGS. 8 and 9, a further application of the present invention is in the metering of material through a die such as when a plastic film or web is formed by extrusion through an extrusion die.

Referring to FIG. 8, a straight die is illustrated wherein plastic material is forced by high pressure screw device into cavity 1. Cavity 1 may be a long circular cavity extending the length of the plastic web in the transverse direction. The liquid plastic will flow through passage 2 to a metering orifice 3 formed by a lower surface or edge 4 and an upper edge 5, where passage 2 and both upper edge 5 and lower edge 4 are transverse to the length of the film.

Surface 5 is the metering surface of a separate deformable element 6 held against the main body of die 7 by studs 8 so as to prevent the plastic from leaking out through the contact area of the element and the die. The hole in the element receiving the stud is larger than the stud so that the element can be moved up and down so as to vary the size of the orifice 3. Rods 9, spaced in the transverse direction, control the up and down movement of element 6 as well as the transverse profile of the orifice by adopting various positions or lengths and so deforming the element in a manner to that previously described. Generally, in the prior art, these various positions are set by a differential screw arrangement (not shown). However, because of inaccessability, it was difficult if not impossible to operate these screw adjustments when the die was used. In the present invention, induction heating coils 10 would be placed around rods 9 so that when the power to these rods is increased, the rods would heat up, expand in length and deform element 6 to the required profile. The teachings with respect to the previous embodiments could also be applied to the extrusion die. Thus, a plurality of rods and coils could replace the coils and flat surface shown in FIG. 4; orifice 3 in FIG. 8 would correspond to orifice opening 4 in FIG. 4.

In order to reduce the flow at a particular location along the length of the die, one can increase the power to the coil controlling the temperature of that rod at that particular location whereby the rod would expand and deform element 6 in accordance with the need to close the orifice gap. To overcome the possibility that the heat required to expand the rod would leak through element 6 and raise the temperature of the plastic to thereby increase the fluidity of the same, it may be desirable to thermally insulate rods 9 from element 6.

Referring to FIG. 9, there is illustrated a circular extrusion die in schematic form. Hot plastic is forced through channel 1 and extruded through a circular orifice 2 to form a continuous extruded tube. Central element 3 is a circular die which can be rotated so as to distribute any orifice gap variations between elements 3 and 4 and make the film thicknesses more uniform. According to the present invention, the variations can be reduced by placing a plurality of coils 5 around the periphery of the circular die and operating them in the manner previously described. Alternatively, one could take the circular die in the form of a spoked wheel where the rim would perform the function of element 6 in FIG. 8 and the spokes of the wheel or rim would operate similarly to rods 9 in FIG. 8. By thermally insulating the spokes from the rim the temperature effect could be eliminated or minimized.

The present invention can also be applied to many other different materials which are metered. Thus, for example, one could employ the principle of the present invention to coaters. In the case of roll coaters, for example, the coating colour is contained in a pan in which the applicator roll revolves and picks up the colour of its surface. An adjustable doctor removes excess colour while the paper web passes over a tension roll and around a pressure roll and is then in contact with the applicator roll which revolves in the same direction. This causes the surfaces to move in opposite directions at the point of contact with the speed of the applicator roll being several times of that of the pressure roll, thus tending to wipe off and smooth the coating surface. Generally, the pressure roll is rubber covered and the application roll surface is metallic. The gap or orifice between the two rolls serves to meter the amount of coating that is allowed to remain on the surface of the web after the doctor blade has done a rough metering of the coating prior to the two-roll metering operation. Thus, one could control the metering at either or both of the locations. For example, the doctor blade can be extended to include an expansion element similar to that used to control the slice orifice of FIGS. 2 and 4 so that both the average transverse thickness as well as the transverse profile of the coating layer on the surface of the applicator roll can be controlled.

Coreless coils could be placed transversely along the surface of the applicator roll in a pattern similar to FIG. 4 where the expansion element surface 2 represents the transverse view of the surface of the roll. While the magnetic field could readily pass through the coating layer, it might be advantageous to locate the coils on that part of the roll surface between the two-roll contact point and the coating pan on the return of the roll to the pan. These coils would then be as close as possible to the surface of the roll depending on which coils were energized or controlled, the local diameter of the roll could be changed by increasing or decreasing the local temperature thereof and this would vary the transverse profile of the gap or orifice between the two rolls.

Another form of coater called the air-doctor or air-knife utilizes a jet of air from an elongated orifice extending the width of the web which removes excess colour and levels and smoothes the coating film on the sheet. In such a coater, one may place one or more coils along one or both sides of the air doctor such that the average transverse size and the transverse profile of the orifice as well as its distance from the coating surface can be varied or controlled. Thus, to decrease a local coating film on the web, the power to the corresponding coils would be increased and this would not only decrease the orifice gap and thus increase the air velocity, but it would also have the effect of moving the orifice closer to the surface of the coating and both these changes would tend to decrease the thickness of the coating film.

Similarly, blade coaters could utilize induction coils to control the gap between the tip of the blade and the web. Print roll coaters could be handled in a manner similar to the above-mentioned roll coaters while in the case of trailing blade coaters, separate expansion elements may be added so that the gap between the blade tip and the web could be controlled. Thus, the gap would be controlled by extending or retracting the tip of the blade or by varying the angle between the blade and the roll in a manner similar to that shown in FIG. 7.

The present invention also includes methods of converting existing control rod systems to an induction heating system. To this end, the control rod which is that element connected to the edge of a metering orifice and which is normally made of material having a high resistivity and high permeability and as such is adaptable to induction heating so that by thermal changes it can be made to move and thereby adjust or change the size of the orifice opening. Thus, referring to FIG. 10, wherein a section of a control rod 101 is shown, a coil 102 can be wound either tightly around rod 101 or the inner diameter of coil 102 can be larger than the rod to provide a gap 104 between the coil and rod to allow for air circulation when cooling when in the contraction mode. Current leads 103 are provided to induction coil 102. Since one does not conduct any heat from coil 102 to rod 101, the magnitude of gap 104 will effect only the efficiency of power transmission by magnetic flux from coil 102 to rod 101. Thus, rod 101 acts as the single-turn short-circuited secondary coil of a transformer with a multi-turn primary coreless coil 102 wound directly around the rod with the wires 105 of coil 102 running in the circumferential direction. Induction coil 102 can be slipped over the end of rod 101 and slid into place or it can be wound, in situ, around rod 101.

Figures 10, 11:
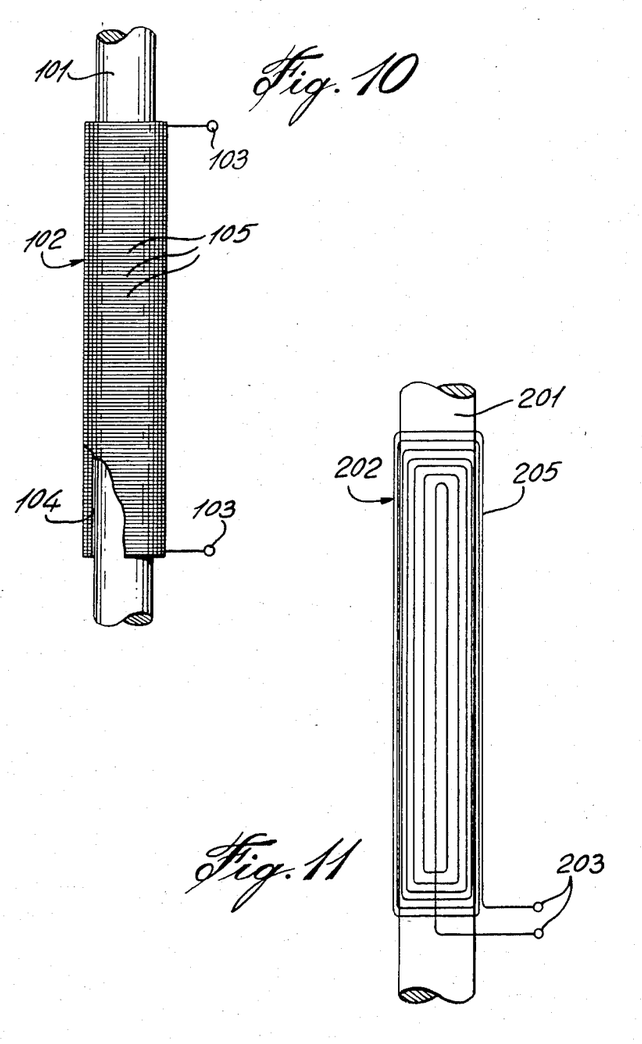
FIG. 10 is a partial view, in elevation, of a modified control rod.
FIG. 11 is a partial side view of a further modified control rod.

By applying an alternating or pulsating current to coil 102, the pulsating magnetic flux so generated passes through certain sections of the rod 101 and introduces pulsating eddy currents therein to thereby heat rod 101. By controlling the power input, the thermal expansion of the rod would be controlled. As will be appreciated by those knowledgeable in the art, the depth of penetration of the magnetic flux into rod 101 is a function of the frequency of the current in induction coil 102.

In FIG. 11, an alternative to the embodiment of FIG. 10 is shown wherein a coreless primary induction coil is also used; however, wires 205 of coil 202 run longitudinally about rod 201 with current leads 203. As in the previous embodiment, a gap may be maintained or wire 205 may be wound tightly about rod 201. A main advantage of this method is that coil 202 may be placed partially (or completely) around rod 201.

Figures 12, 13:
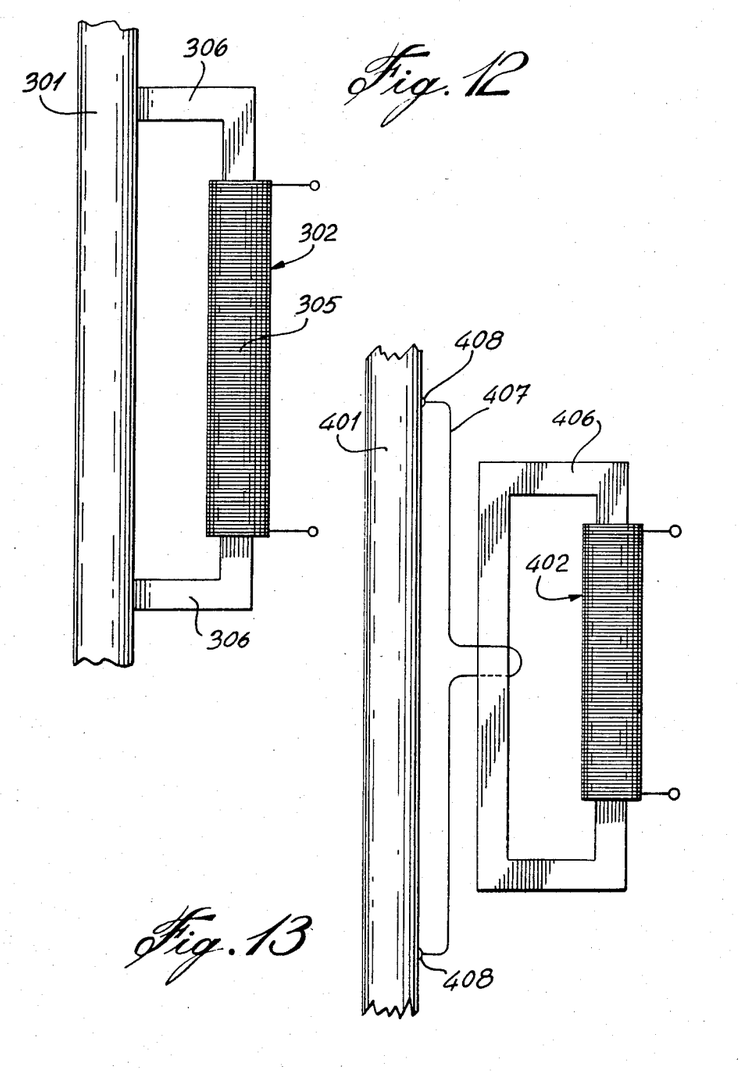
FIGS. 12 and 13 are partial views of modified control rods according to one aspect of the invention.

In the embodiment of FIG. 12, coil 302 formed of wires 305 is formed about a magnetic core 306. Magnetic core 306 is connected to rod 301 by suitable means so that rod 301 completes the magnetic flux circuit. As is conventional, magnetic core 306, being made of a suitable material, does not heat up. However, rod 301 having a higher resistivity and permeability does heat and expand whenever current is passing through coil 302.

In FIG. 13, a still further embodiment is illustrated. In this embodiment, the magnetic flux emanating from primary coil 402 is concentrated in closed loop 406. A low resistance electrical conductor 407 is electrically connected to the higher resistance control rod 401 at appropriate contact points 408 and is wound about core 406 for at least one loop. By keeping the loops of conductor 407 about core 406 to a minimum, the voltage in the electrical circuit consisting of the section of rod 401 between the contacts and conductor 407 can be kept very low and the current very high. Thus, by controlling the electrical input to coil 402, the temperature of rod 401 can be controlled.

For situations where any one of the above methods may not be feasible another approach would be to add an extension to the existing rod, such that the extension would be more accessible and to which one of the above methods for heating could be applied; in such a case the restraining element and/or the existing rod adjusting device may be relocated or redesigned. In one such design, the rod extension could be contained within a hollow cylinder connected to the existing restraining element by screw threads so that by rotating the cylinder, one end would position the rod as before.

In operation, the simplest method of proceeding would be to determine the effective expansion required to control the desired physical property about the desired average value of that property, then to heat the rod to that expansion level where the same amount of control would be available above and below the average value and the contraction mode would be maintained by merely shutting off the power to the induction coil and allowing the heat from the rod to dissipate into the surroundings.

Figure 14:
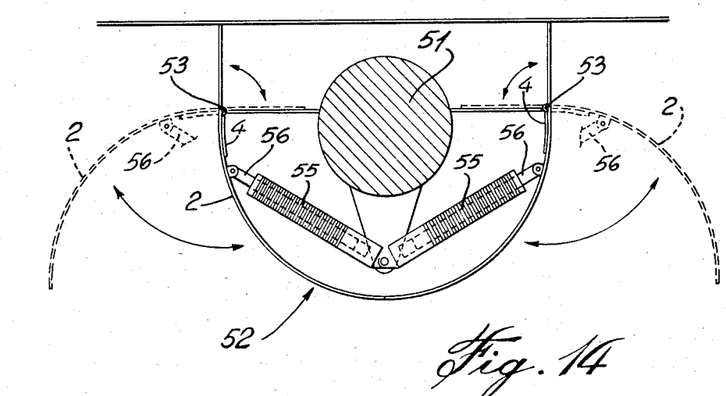
FIG. 14 is a sectional view of a control rod including heat containment means.

Several modifications could be made to maximize the cooling/heating effects. For example, the surface of the control rods could be dark in colour to increase heat dissipation by radiation. In FIG. 14, a split sheath 52 surrounds the exposed part of a control rod 51, with the sheath hinged at points 53. The sheath is spring-loaded by spring 4 to hold it at the open position when power to the induction coil is turned off; when power to these coils is turned on, power from the same source would activate coils 55 which would draw core magnets 56, which are attached to the sheath, into their respective coils, thereby closing the sheath. Fins could be added to increase the cooling effect.

There are, of course, many other ways the control rods could be cooled. Air could be circulated around the rod or through it if the rod was hollow. Liquid fluids could also be circulated for purposes of cooling. In the situation where the induction coil is wrapped around the rod in contact with it, copper tube could be used for the induction coil and water could be circulated through the coil to cool both the coil and the rod.

Figure 15:
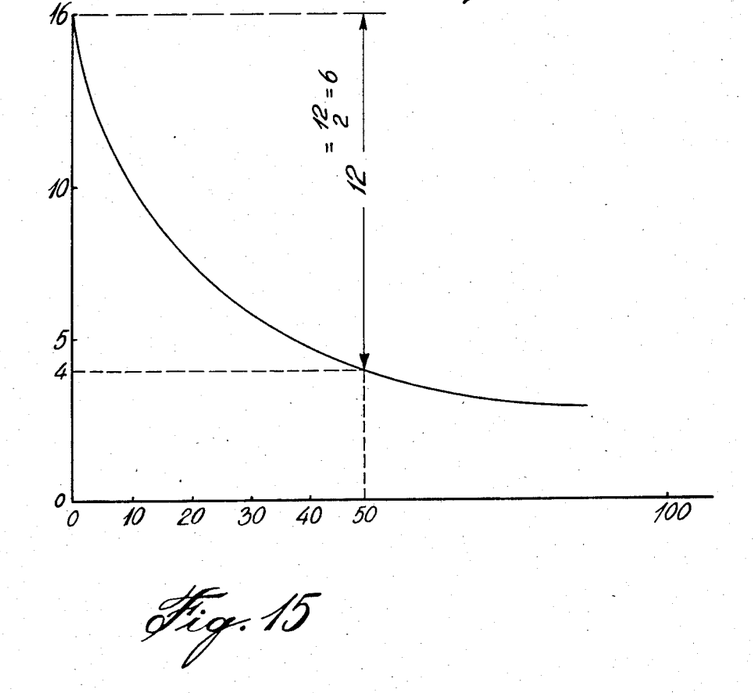
FIG. 15 is a graph of a hypothetical cooling curve.

FIG. 15 illustrates a hypothetical cooling curve for a control rod which has been heated to expand sixteen one thousandths of an inch. If one decides fifty minutes is the longest one can wait for the rod contraction to settle down then the effective expansion for control purposes becomes $(16-4) \div 2 = 6$. Thus, if one knows that all the control rods exhibit approximately the same cooling curve, one rod equipped with a micrometer transducer to measure rod expansion could act as a monitor for all rods. If groups of rods have similar cooling curves, a rod in each group could monitor that particular group. Such a type of micrometer control is well known and could be operated as follows:

(a) System is placed on automatic micrometer control and the computer would keep the power on to the induction coils until the rods have expanded to the effective expansion point which in the case of a cooling curve similar to that in FIG. 15, would be 10 on the curve and the computer would keep the expansion at that point (by turning the power off-on) until instructed otherwise.

(b) The operator of the equipment would then manually adjust the existing rod adjusting device for each rod until he had obtained the best possible property profile; and (c) with these coarse adjustments made, the operator would then be in a position to place a system on the automatic property control at which time the property sensor would then take control and operate the appropriate control rods.

Figure 16:
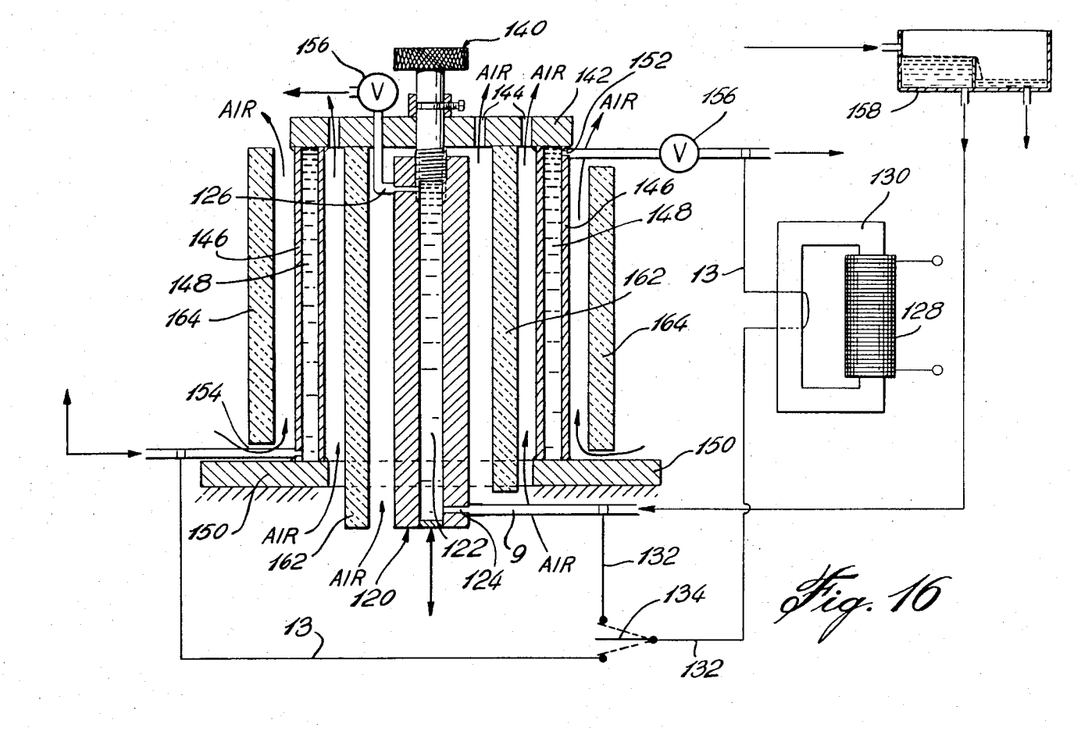
FIG. 16 is a cross-sectional view of a further embodiment wherein positive control of the control rod in two directions is provided.

Referring to FIG. 16 there is shown a first structural element 120 made from a material having specific properties suitable for the present embodiment as will be discussed hereinbelow. Member 120 (which is a control rod) has an interior cavity 122 communicating with the exterior of element 120 via apertures 124 and 126 at opposed ends of the structural element. Structural element 120 is also provided with an adjustment member 140 screw-threadedly engaged with element 120 for providing a manually operated differential adjustment so that structural element 120 can move up or down by way of a manual adjustment. In this respect, it will be understood that the lower end of element 120 is that part of the system which is connected to a metering device for the purpose of controlling the desired profile.

Element 120 and adjustment member 140 are structurally connected to a rigid plate 142 having a plurality of apertures 144 therein. In turn, plate 142 is connected to a second rigid electrically conductive structural annular element 146 having cavity 148 therein. At its lower extremity, second structural element 146 is connected to an immoveable flange element 150. In a manner similar to first structural element 120, the second strucutral element 146 has a pair of apertures 152 and 154 at opposed extremities of the element communicating with interior cavity 148.

A magnetic flux generator, consisting of coil 128 and core 130 is provided which generates a current in circuit 132 consisting in part of a conductor of low resistivity forming at least one loop around core 130, with element 120 or element 146 of higher resistivity forming the remaining part of the circuit 132. Circuit 132, having a current induced therein of high amperage, low voltage, is operatively associated with a switch 134. In a first operative position, switch 134 is connected to structural element 120 which as stated forms a portion of the circuit 132. Accordingly, when switch 134 is in the aforesaid first operative position, first structural element 120 will be heated and will expand whereby the lower end of the element will move downwardly to control the profile of the metering device (not shown) to which it is connected. When switch 134 is in its second operative position, second structural element 148 becomes a portion of circuit 132 and is heated. In so doing, second strucutral element 146 will be heated and force plate element 142 upwardly thereby causing first structural element 120 to also move upwardly (i.e. in its contracting direction).

Apart from providing a precise positive control of both expansion and contraction modes, the dual structural elements can be advantageous compared to the single structural element such as shown in FIG. 13. Thus, the single element/control rod would be heated to one-half of its "effective expansion" before the coarse adjustment would be made so that if the power failed the control would drift away from the coarse setting. However, in the embodiment of FIG. 16, the coarse adjustment would be made with both members in a non-heated mode so that in the event of a power failure, the control would return to the previous coarse setting. While the embodiment of FIG. 13 can be of advantage in applications of FIG. 16, thoseof FIGS. 2, 4, 7, 8, 9, 10, 11 and 12 can also be of use.

The above magnetic flux generator can utilize readily available power sources at low frequency (i.e. 50, 60 cycle) and voltages (i.e. 220 v; 110 v, 24 v) with the circuit 132 as previously mentioned, producing a safe high amperage low voltage element. The power control of such a circuit can be easily done using known devices.

In the embodiment of FIG. 16, it is desirable to provide a tubular insulation annulus 162 intermediate first and strucutral elements 120 and 146 respectively to prevent thermal interaction. A second insolation tubular annulus 164 is provided exteriorly of member 146 to reduce thermal loss during the heating mode.

In operation, water or any other suitible cooling fluid may be utilized to cool cavities 122 and 148 of members 120 and 146 respectively. Thus, a water head box 158 may be connected to lower apertures 124 and 154 with water outlets being provided by upper apertures 126 and 152. Suitable valve controls 156 may be provided on the outlet pipes leading from apertures 126 and 152.

In addition means may be provided for positive (convection) air circulation in annulii 110 intermediate outer annulus 164, second structural element 146, annulus 162 and first structural element 120. Outlet for air cooling may be provided through apertures 144 in plate 142. Air circulation would be used where annular element 146 was replaced by a single wall cyclinder.

When water is used for cooling, heavy copper tubing could serve as part of circuit 132. Naturally, other suitable connection means may be utilized.

To control the rate of water cooling, valve controls 156 are utilized. wherein headbox 158 provides the required gravity feed. One advantage of this system is that as soon as a member is placed in the heating mode, its outlet valve would be closed and any steam/hot air formed in the water space (cavity) would force the remaining water back into the headbox and avoid any necessity to heat it. Valves 156 could be controlled separately so as to control the cooling/contraction rate.

Electrical insulation can be provided as required, since the voltage in the secondary circuit is low, this requirement would be minimal (all parts could be coated with insulating resin). It will be appreciated that the system can be utilized having a very low voltage but high currents to develop substantial forces without resorting to the uses of springs, levers and the like to provide movement in a second direction.

Alternatively to using one magnetic flux generator (core 130, coil 128) and one switch 134 operating circuit 132, one could use two magnetic flux generators, one for element 120 and one for element 146 and the power to coil 128 of each generator could be switched by a less expensive and smaller device; this would also provide for improved control over the electrical resistance of circuit 132. Referring again to FIG. 16, plate 142 could be replaced by rigid beam at the ends of which would be attached two hollow rods which would replace element 146 (with element 120 in the middle); the two outside rods or cylinders would be connected electrically in parallel.

Where it is desirable and/or necessary to monitor the profile of the opening of the metering orifice so it or the position of at least one of its elements is known at all times, this embodiment would protect the orifice from damage as well as facilitate the control of the property of the product which is dependent on the metering operation. Prior art devices are known including the use of position transducers, the output from which determines the position of the orifice element. The operator or a computer reading the basis weight of the above product then sets the target value which is then compared with the position and the difference generally referred to as the "error", is used to activate the control rods in a manner described above.

In connection with the above, it has been found by applicant that the following parameters for the structural element are desirable: the structural element should have a co-efficient of expansion greater than $0.10 \times 10^{-6}$ per °C. and be electrically conductive with an electrical resistivity greater than 7 ohms per cu. cm $\times 10^{-6}$ (20° C.); in order to meet structural requirements, the material should have a modulus of rigidity greater than $5 \times 10^6$ psi (20° C.) and a tensile strength greater than 40 k/psi.

To take advantage of the principles of hydraulics and the multiplying effect of translating cubic expansion into a linear movement, a further embodiment of the present invention involves associating a heat-expandable member/closed system with the movable edge of the opening, where such a closed system involves a non-compressible, heat-expandable fluid which is heated by the magnetic flux generated by a magnetic field and the resulting thermal expansion of the fluid generates a linear movement and force which then moves/controls the moveable edge. For such a system to work the material which contains the fluid must itself have thermal expansion characteristics which do not cancel out the expansion of the fluid; materials with good insulating properties are generally good candidates such as are used in the crucibles for induction furnaces. Where the fluid has the proper electrical/magnetic characteristics, for example, mercury and special fluid composites, the magnetic flux will heat the fluid directly; for the other fluids, such as water, they can be heated indirectly by keeping them in contact with materials which will themselves heat up under the influence of the magnetic flux; materials used for the above embodiments would be very suitable; a combination of direct and indirect heating could also be used. Where the fluid being heated directly is expensive, its use can be extended by using in series with it, a less expensive non-compressible fluid which is relatively insoluble in it or which is separated from it by a third material (liquid or solid) at a point where the heating is not necessary. The material or system containing the fluid can take numerous shapes depending on the application, for example, it could be a simple spherical container or it could be a long flexible thin cylinder wound up into a coil. The methods for heating the fluid could be any of those previously described e.g., those of FIGS. 10, 11, 12 and 13. In the example of FIG. 13, a high amperage, low voltage current could be passed through a column of mercury contained in a suitable closed system, the features of FIG. 16 could be used in a similar way. To transmit the expansive movement and force of the fluid to the moveable edge many well-known hydraulic systems involving pistons, diaphragms and bellows can be used; similarly, mechanical advantages can be created by using systems similar to those used in hydraulic jacks. As was mentioned above in connection with previous embodiments, it is important that a proper balance between heating and cooling be obtained so that proper control is available when in the contraction/cooling mode; methods for this have been described.

It will be understood that the above-described embodiments are for purposes of illustration only and changes and modifications may be made thereto without departing from the spirit and scope of the invention.

I claim:

1. An apparatus for controlling the size of an opening through which material is metered, said opening being defined by at least first and second members spaced apart from each other, at least one of the members being movable toward or away from the other member to change the size of the opening, a heat expandable member associated with the movable member and a fixed base, magnetic field generating means for generating a magnetic field and including an induction coil spaced from said heat expandable member, said induction coil having a magnetic core which is operatively connected to said heat expandable member whereby magnetic flux generated by said magnetic field is conducted from the magnetic core to said heat expandable member to heat the same, the heat expandable member having higher resisitivity and permeability than said magnetic core, thereby causing said expandable member to expand and cause movement of the movable member, said magnetic field generating means being located in a position relative to the heat expandable member so that no external material will impede magnetic flux from the magnetic field inducing heat in said heat expandable member and so that the magnetic field generating means may generate a maximum amount of flux and a minimum amount of heat.

2. The apparatus of claim 1 wherein said induction coil has a closed loop magnetic core, an electrical conductor forming at least one loop around said core, said conductor being electrically connected to said heat expandable member which has a relatively high electrical resistivity.

3. The apparatus of claim 1 wherein said opening is a slice opening defined by upper and lower lips of a slice and said movable member is one of said slice lips.

4. The apparatus of claim 3 including a plurality of said heat expandable members, each of said heat expandable members having a magnetic field generating means associated therewith.

5. A method of use in controlling the size of an opening through which material is metered and wherein at least part of said opening is defined by a movable member with a heat expandable member associated with the movable member and a fixed base, the method comprising the steps of providing magnetic field generating means, positioning the magentic field generating means about a magnetic core, electrically connecting said magnetic core to said expandable member by a low resistance electrical conductor to close the magnetic circuit of said core with the heat expandable member, and selectively controlling the application of electrical power to the magnetic field generating means to cause the generation of magnentic field and thereby cause generation of heat in the heat expandable member to control the size of the opening.

6. The method of claim 5 wherein said magentic field generating means includes a closed loop magnetic core, placing an electrical conductor of relatively low electrical resistivity in electrical contact with said heat expandable member which is of a relatively high electrical resistivity such that the conductor forms at least one loop about said magnetic core and said conductor and heat expandable member form a closed electrical circuit.

7. The method of claim 5 wherein the method involves the metering of paper making stock and the opening includes upper and lower lips of a slice and where the edge of at least one of said slice lips is said movable edge.

8. An apparatus controlling the size of an opening through which material is metered, said opening being defined by at least first and second members spaced apart from each other, at least one of the members being movable towards or away from the other member to change the size of the opening, first and second heat expandable members associated with said movable member, magnetic field generating means for generating the the magnetic field, said magnetic field generating means being operatively connectable to either one of said heat expandable members to cause movement of said movable member when the magnetic field generating means is operated, said first heat expandable member being structured to move said movable member in a first direction, said second heat expandable member being structured to move said movable member in a second direction opposed to said first direction.

9. The apparatus of claim 8 wherein at least one of said heat extendable members is formed of a material having a co-efficient of expansion greater than $0.10 \times 10^{-6}$ per °C., electrical resistivity greater than 7 ohns per cu. cm. $\times 10^{-6}$ (20° C.), a modulus of rigidity greater than $5 \times 16^6$ psi (20° C.), and tensile strength greater than 40 k/psi.

10. A method of use in controlling the size of an opening through which material is metered and wherein at least part of said opening is defining by a movable member, the method comprising the steps of placing first and second heat expandable structural elements in an operative relationship with the movable member, operatively coupling a magnetic fiel generating means with both said first and second heat expandable elements such that in a first mode a magnetic flux generated by said magnetic field generating means will cause movement of said first heat expandable structural element in a first direction and in a second mode will cause movement of said second heat expandable structural element in a second direction opposed to said first direction, and selectively operativing the generating means to control the size of the opening.

11. The method of claim 10 wherein the heat expandable structural elements are control rods, and the step of placing magnetic field generating means in association with said control rods comprises the steps of placing said magnetic field generating means about a closed loop magnetic core, placing an electrical conductor of relative low electrical resistivity in electrical contact with said control rods such that the conductor forms at least one loop about said magnetic core and said conductor and control rods form a closed electrical circuit.

12. An apparatus for controlling the size of an opening through which material is metered, said opening being defined by at least first and second members spaced apart from each other, at least one of the members being movable toward and away from the other member to change the size of the opening, a heat expandable means associated with or forming part of the movable member and a fixed base, magnetic field generating means including an induction coil and a magnetic core associted with said induction coil for generating a magnetic field, said magnetic field generating means being operatively associated with and in relatively closely spaced relationship to said heat expandable means such that magnetic flux generated by said magnetic field is conducted from the magnetic core to said heat expandable means to cause an in-situ generation of heat in the same, the heat expandable means having resistivity and permeability than said magnetic core, thereby causing said expandable means to expand and cause movement of the movable member.

13. The apparatus of claim 12 wherein said magnetic field generating means is located in a position relative to the heat expandable means so that no external material will impede magnetic flux from the magnetic field inducing heat in said heat expandable means and so that the magnetic field generating means may generate a maxium amount of flux and minimum amount of heat.

14. A method for controlling the size of an opening through which material is metered and wherein at least part of said opening is defined by a movable with a heat expandable means associated with or forming part of the movable member and a fixed base, the method comprising the steps of providing magnetic field generating means, positioning the magnetic field generating means about magnetic core to enable generation of a magnetic field, positioning the magnetic field generating means in closely spaced relationship to the heat expandable means, causing in-situ heating of the heat expandable means by coupling magnetic flux in said magnetic field with the heat expandable means thereby resulting in thermal expansion of said heat expandable means, and selectively controlling the amount of magetic flux generated to thereby control the amount of thermal expansion of said heat expandable means and the size of the opening.

15. The method of claim 14 wherein the method involves the metering of paper making stock and the opening includes upper and lower lips of a slice and where the edge of at least one of said slice lips is said movable edge.

* * * * *